United States Patent [19]

Kuzara et al.

[11] Patent Number: 5,611,607
[45] Date of Patent: Mar. 18, 1997

[54] ELECTRONIC LIBRARIAN AND FILING SYSTEM AND METHOD

[75] Inventors: Patricia A. Kuzara; James H. Kuzara; Stephen A. Kuzara, all of Sheridan, Wyo.

[73] Assignee: ELF Technologies Corporation, Sheridan, Wyo.

[21] Appl. No.: 548,028

[22] Filed: Oct. 25, 1995

Related U.S. Application Data

[63] Continuation-in-part of Ser. No. 330,713, Oct. 28, 1994.

[51] Int. Cl.$^6$ ................................................ A47B 81/06
[52] U.S. Cl. .......................................... 312/9.14; 312/9.54
[58] Field of Search .................................. 312/9.11, 9.12, 312/9.14, 9.21, 9.23, 9.35, 9.36, 9.54, 272, 272.5

[56] References Cited

U.S. PATENT DOCUMENTS

| | | |
|---|---|---|
| 1,755,074 | 4/1930 | Ray et al. . |
| 2,426,712 | 9/1947 | Simpson . |
| 2,539,647 | 1/1951 | Williams . |
| 2,763,366 | 9/1956 | Smith et al. . |
| 2,864,526 | 12/1958 | Buss . |
| 4,609,232 | 9/1986 | Florence . |
| 4,875,743 | 10/1989 | Gelardi et al. . |
| 4,920,432 | 4/1990 | Eggers et al. . |
| 5,022,020 | 6/1991 | Langman et al. . |
| 5,103,437 | 4/1992 | Kawakami . |
| 5,117,984 | 6/1992 | Kennedy . |
| 5,150,221 | 9/1992 | Shima . |
| 5,214,628 | 5/1993 | Langman et al. . |
| 5,241,466 | 8/1993 | Perry et al. . |
| 5,275,480 | 1/1994 | Hyman et al. . |
| 5,299,181 | 3/1994 | Koguchi . |

Primary Examiner—Peter M. Cuomo
Assistant Examiner—Gerald A. Anderson
Attorney, Agent, or Firm—John R. Flanagan

[57] ABSTRACT

An electronic librarian and filing system includes an article storage unit, article locator mechanism, article retrieval mechanism, and electronic control unit. The article storage unit has a receptacle storing articles, such as individual CD's on edge, in successive side-by-side locations. The article locator mechanism disposed in the receptacle is movable relative to the successive locations to identify the location of each of the articles stored therein. The article retrieval mechanism carried with the article locator mechanism is operable to partially remove a selected one of the CD's from its location so that it can subsequently be fully removed from the receptacle by a user. The electronic control unit includes a keyboard used to input information which identifies CD's stored in the article storage unit and their unique locations, a display to output such information, a microprocessor to process inputted information and the stored information about the identification of the CD's and their locations in the receptacle, and a memory to store the information which can be accessed via the microprocessor by use of the keyboard and reviewed on the display.

14 Claims, 8 Drawing Sheets

ELECTRONIC LIBRARIAN AND FILING SYSTEM AND METHOD

CROSS-REFERENCE TO RELATED APPLICATION

This application is a continuation-in-part of copending U.S. application Ser. No. 08/330,713, filed Oct. 28, 1994, still pending.

BACKGROUND OF THE INVENTION

1. Field of the Invention

The present invention generally relates to systems for filing, storing and retrieving articles and, more particularly, is concerned with an electronic librarian and filing system and method for storage and retrieval of articles, one example of such articles being compact discs (CD's).

2. Description of the Prior Art

Disc-shaped recording media, primarily in the form of compact discs (CDs) and CD-ROMs, are currently undergoing accelerating growth in use. At the same time, user frustration has arisen from not being able to store and/or carry and easily access relatively quickly a large number of compact discs (CD's), especially for CD systems employed in vehicles and the like. While in their protective cases, CD's are cumbersome to handle and carry around, difficult to store, especially in a vehicle, and awkward to remove and install, especially when driving.

There are two types of solutions to this problem currently in the marketplace. One solution is the provision of a flip box for CD's. The flip box is in the form of a small box that has pages in it like a loose leaf notebook. Each page has a plastic protector into which the CD is inserted to protect it. The user must open the box, flip through the pages, read the small CD titles and select and remove the CD the user desires to play. Although better than carrying the CD's in their individual cases, the flip box is limited to 24–40 CD's and locating, retrieving and returning CD's is not easy. U.S. Pat. No. 4,875,743 to Gelardi et al discloses a storage device for CD's somewhat similar to this solution.

Another solution is the provision of a multi-CD player. Some multi-CD players which typically are limited to playing up to four CD's are mounted in the dash of the vehicle. Other multi-CD players which typically play up to six CD's are mounted in the trunk of the vehicle and linked electronically to a selector keyboard on the dash. Other multi-CD players used in the home, office or business environment can play even larger numbers of CD's. However, these players are very complex, quite expensive and, in the case of the vehicle multi-CD players, very limited with respect to the number of CD's accommodated.

Consequently, a need still exists for a suitable CD storage and retrieval system. The vast majority of CD users still use single CD players and are expected to continue such use for considerable time. Thus, a suitable CD storage and retrieval system will be one that is easily portable, will hold an adequate number of CD's, will easily fit on the center console or front seat of a vehicle, provide easy access to the CD's stored therein, and make it easy to find where to locate the CD and to retrieve the chosen CD.

Such system should also be equally suited for use in the storage and retrieval of CD-ROMs which are finding a growing presence in homes and businesses. CD-ROMs appear to be the wave of the future in legal, medical and other business offices for efficient storage and retrieval of reference and other information as well as client, patient and customer records.

SUMMARY OF THE INVENTION

The present invention provides an electronic librarian and filing system and method designed to satisfy the aforementioned need. The system described herein solves all of the aforementioned problems and fills the gap between the flip box, which is difficult to use and limited in the number of CD's being handled, and the multiple CD players which are expensive and also limited in the number of CD's accommodated and basically to the audio playback of the recorded information.

While the electronic librarian and filing system of the present invention is particularly suited for storage and retrieval of CD's for entertainment applications, it is not so limited in its applications. The musical CD is merely one example of the type of article to which the electronic librarian and filing system of the present invention can be applied. It can equally be used for storage and retrieval of the aforementioned CD-ROMs in both home and business environments. The system is versatile and functions well in meeting the criteria outlined above for suitability as a CD storage and retrieval system in diverse applications, that is, it has portability, adequate capacity, ability to fit on a shelf in an office or the center console or front seat of a vehicle, and easy accessibility to the stored CD's (including CD-ROMs) in terms of finding their location and retrieving a chosen CD.

Accordingly, the present invention is directed to an electronic librarian and filing system which comprises: (a) an article storage unit having means for storing articles in a plurality of successive side-by-side spaced unique locations; (b) an article locator mechanism disposed in the article storage unit and having a first portion stationarily aligned with the plurality of locations in the article storage unit and a second portion movable relative to the first portion and the unique locations aligned therewith to a selected one of the locations and adapted to indicate the selected unique location; and (c) an article retrieval mechanism disposed in the article storage unit and being movable with the second portion of the article locator mechanism, the article retrieval mechanism being actuatable to at least partially remove the selected one of the articles from the selected unique location in the article storage unit so that the selected article can be fully removed from the article storage unit.

More particularly, the article storage unit of the system includes an elongated receptacle, an elongated carrying handle, and a cover assembly having front and rear lid sections. The receptacle has an interior cavity. The handle and cover assembly are mounted to undergo movement between closed and opened positions relative to the receptacle. In the closed position, the handle is disposed above the receptacle for gripping by a user to carry the article storage unit and the front and rear lid sections are disposed in generally tandem side-by-side relationship with respect to one another, extending over an opening in the receptacle to the interior cavity thereof. In the opened position, the handle is disposed adjacent to the rear of the receptacle and the front and rear lid sections are disposed in overlapped relationship with respect to one another, exposing the opening to interior cavity of the receptacle.

In a first embodiment of the system, the means for storing articles in the unique locations is a support rack disposed in the interior cavity of the receptacle and defining a row of individual storage compartments. The articles are removably supported in the compartments in a spaced side-by-side vertical relationship with respect to one another. In a second embodiment of the system, the means for storing the articles in the unique locations is a plurality of storage and retrieval arms being aligned with the unique locations and being equal in number to the number of articles stored in the interior cavity of the receptacle. The arms are pivotally mounted in the receptacle by an elongated common shaft extending between and mounted at opposite ends of the receptacle so as to position the arms in side-by-side relationship to one another between opposite ends of the unit. The arms have arcuate shaped grooves in which the respective articles are received and held on edge in parallel vertical planes aligned with the successive side-by-side spaced unique locations.

Further, in the first embodiment of the system, the stationary first portion of the article locator mechanism includes a pair of laterally spaced front and rear guides located in a lower portion of the interior cavity of the receptacle below the support rack, and a row of markings defined on the receptacle adjacent to the rear guide. Each marking is aligned with one of the storage compartments in the support rack. The movable second portion of the article locator mechanism includes a carriage mounted in the receptacle between the front and rear guides to undergo sliding movement along the underside of the support rack in the receptacle, and a location reader device mounted on the carriage so as to face toward the row of markings. The reader device is operable to sense the different markings and thus provide a reading of the one of the markings with which it happens to be aligned.

In the second embodiment of the system, the stationary first portion of the article locator mechanism can either be means in the form of an elongated strip mounted along the front of the receptacle containing a row of indicia marking the succession of unique locations or a printed circuit board containing multiple parallel conductors tracks thereon being mounted in the interior chamber of the receptacle on an interior surface of a bottom wall thereof, a driver circuit connected to the same one ends of the respective conductor tracks and an LED display connected to the driver circuit. The movable second portion of the article locator mechanism is a carriage mounted through a horizontal slot defined in the front wall of the receptacle so as to undergo sliding movement therealong, and an elongated conductor member attached at one end to the carriage so as to extend into the interior cavity of the receptacle transversely to and overlying the printed circuit board so as to engage certain ones of the parallel conductor tracks. As the conductor member is moved along the tracks with movement of the carriage along the slot in the receptacle, the conductor member completes an electrical circuit with different combinations of the multiple tracks having different lengths of exposed conductive portions so as to conduct electricity through selected ones of the tracks which form a number, such as a binary-coded decimal or BCD number, corresponding to the particular location of the conductor member and thereby cause the driver circuit to drive the LED display to form and indicate a number which corresponds to the particular number of the location being passed over by the conductor member and thereby the locator mechanism to read and display each of the unique locations of the articles stored in the receptacle.

Still further, in the first embodiment of the system, the article retrieval mechanism includes an actuator lever and an ejector member which are supported by the carriage of the article locator mechanism and thus are adapted to work in coordination with the article locator mechanism. The actuator lever is pivotally mounted on the front guide. The lever at its outer end extends from the receptacle and at its inner end is pivotally coupled to the ejector member. The ejector member underlies the support rack in the receptacle and is slidably mounted to undergo vertical movement through an opening defined in the carriage. Once the carriage and reader device have moved into alignment with the one of the markings identifying the unique location of the one of the storage compartments in the support rack containing the desired article to be retrieved, the actuator lever is pivoted to slidably move and apply a force from below the article to lift the ejector member upwardly through an elongated slot formed in the bottom of the support rack so as to cause lifting of desired article at least partially upwardly from the one storage compartment of the support rack so as to make it easy for the user to then grip portions of the article and fully remove it from the receptacle.

In the second embodiment of the system, the article retrieval mechanism is moved with the movable second portion of the article locator mechanism and can be actuated to partially remove or raise a selected one of the articles from its location in the article storage unit so that it can subsequently be fully removed therefrom, such as manually by a user. The article retrieval mechanism includes an actuator lever and an ejector member which are supported by the carriage of the article locator mechanism and thus are adapted to work in coordination with the article locator mechanism. The actuator lever at one end is pivotally mounted on the carriage and extends therefrom to an opposite end positioned below the pivotal storage and retrieval arms. Once the carriage is aligned with the desired unique location of the article to be retrieved and thus the actuator lever is positioned below the particular arm holding the article, by then depressing the ejector member the actuating lever is pivoted upwardly such that its opposite end engages the bottom of the arm and applies a force from below the article to the arm so as to cause the arm to pivot upwardly and outwardly toward the opening in the receptacle so as to project the desired article at least partially upwardly and forwardly from interior cavity of the receptacle and thus make it easy for the user to then grip portions of the article and fully remove it from the receptacle.

The electronic librarian and filing system also comprises an electronic control unit which, in a first embodiment of the system, is coupled to the article locator mechanism, whereas, in a second embodiment, is independent of the article locator mechanism. In the first embodiment of the system, the electronic control unit includes means, such as a display, for providing at least an output of the unique locations of the articles as they are sensed and read by the article locator mechanism. The electronic control unit of the system also includes means, such as a microprocessor, for processing inputted information identifying the articles stored in the article storage unit, means, such as a memory connected to the microprocessor, for storing the inputted information, and means, such as a keyboard connected to the microprocessor, for initially inputting such information and for providing access, that is, to call-up and review, such information about the articles stored therein. The display also is connected to the microprocessor. The microprocessor is programmed to function in scan and search modes so as to access the memory and find the unique location of a selected article in the article storage unit. Once the desired location has been identified, the user can then move the location reader device of the article locator mechanism relative to the receptacle to read the respective markings thereon and find the desired unique location of the selected article in the article storage unit so that the article ejector mechanism can be operated to at least partially remove the selected article from the unique location.

In the second embodiment of the system, the electronic control unit is not coupled to and thus is separate from the article locator mechanism. In this embodiment, the article locator mechanism provides a display on the article storage unit which indicates the unique locations of the articles as they are read by the article locator mechanism upon movement of its second portion relative to the first portion thereof. The electronic control unit functions to input, store and retrieve information identifying all of the articles stored in the article storage unit and their unique locations therein such that the unique location of a selected one of the articles can be recovered by entering certain information to scan the memory of the unit.

The present invention is also directed to a electronic librarian and filing method which comprises the steps of: (a) storing a plurality of disk-shaped articles on edge in a plurality of successive side-by-side spaced unique locations between opposite ends of and in an interior cavity of a receptacle; (b) moving an article locator mechanism between the opposite ends of the receptacle past and successively into alignment with the respective locations therein so as to indicate the respective locations as the article locator mechanism is successively brought into alignment therewith; (c) moving an article retrieval mechanism with the article locator mechanism successively into alignment with the respective locations until the article locator and retrieval mechanisms are positioned in alignment with a selected one of the unique locations storing a selected one of the articles; and (d) actuating the article retrieval mechanism so as to at least partially remove the selected one of the articles from the unique location in the receptacle so that it can be fully removed from the article storage unit. In a first embodiment of the method, the article is lifted substantially along a liner path in a substantially upward direction relative to the receptacle. In a second embodiment of the method, the article is lifted substantially along an arcuate path in a substantially upward and forward direction relative to the receptacle.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figures 1, 2A, 2B, 2C, 3:
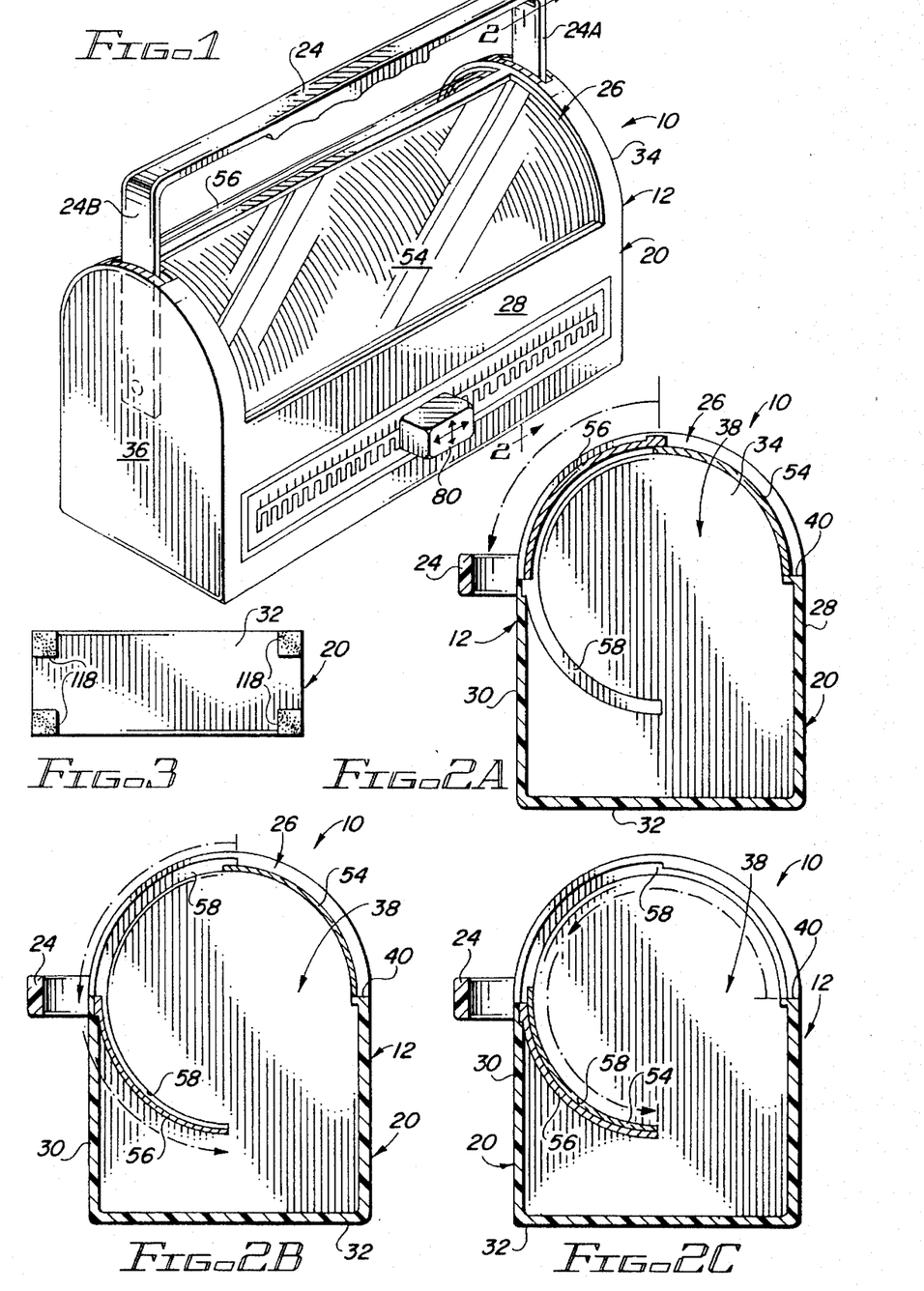
FIG. 1 is a perspective view of a first embodiment of an article storage unit of an electronic librarian and filing system of the present invention.
FIGS. 2A, 2B and 2C are cross-sectional views taken along line 2—2 of FIG. 1, showing a sequence of steps for converting the handle of the article storage unit from an upright to folded position and the lid assembly of the storage unit from a closed to opened position.
FIG. 3 is a bottom plan view, on a reduced scale, of the receptacle of the article storage unit.
Figures 4, 5, 6, 7, 8, 9:
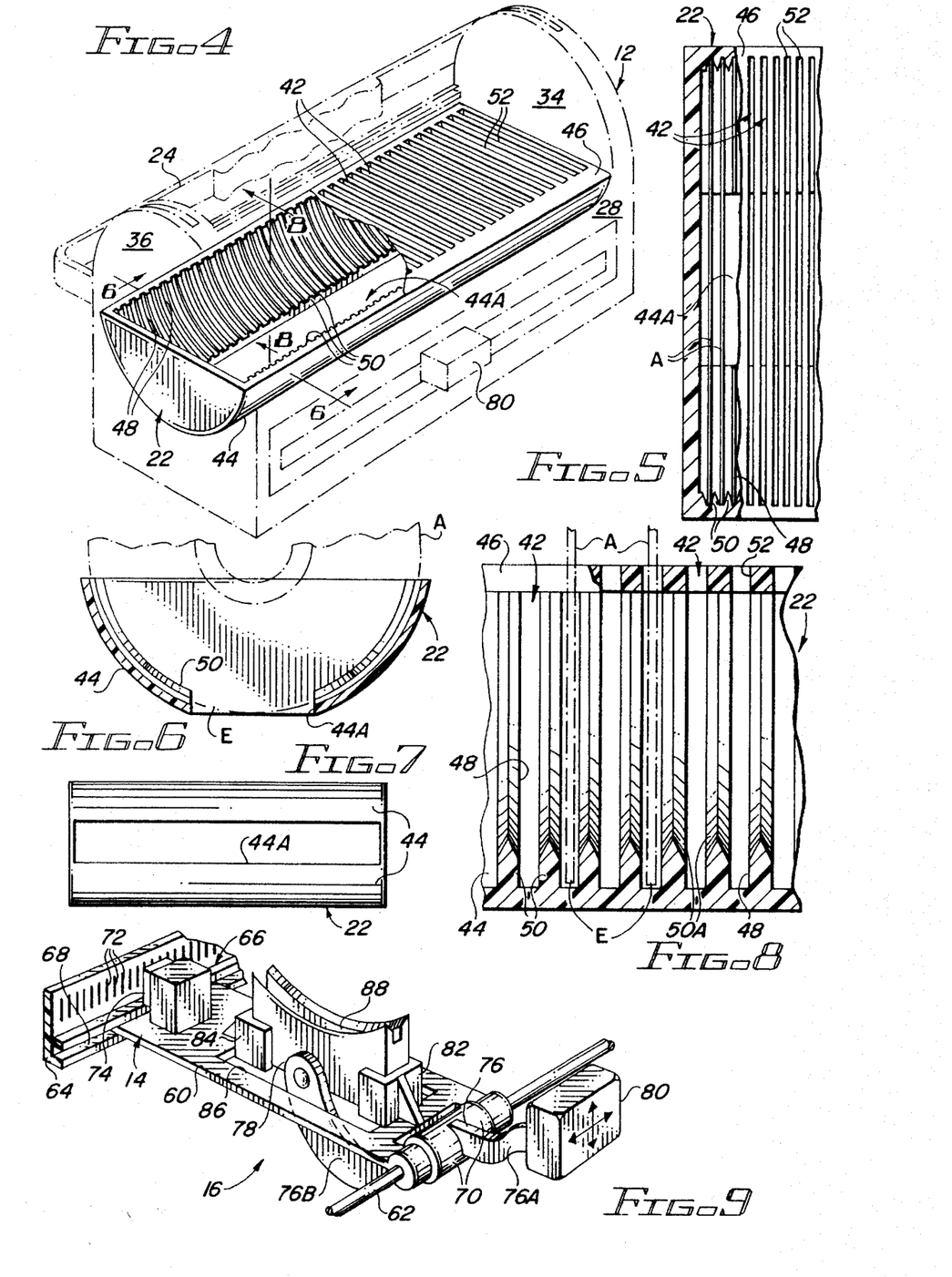
FIG. 4 is a perspective view of a support rack disposed in the receptacle of the article storage unit.
FIG. 5 is an enlarged fragmentary top plan view of the support track with portions broken away.
FIG. 6 is an enlarged cross-sectional view of the support rack taken along line 6—6 of FIG. 4.
FIG. 7 is a bottom plan view, on a reduced scale, of the support rack.
FIG. 8 is an enlarged fragmentary longitudinal sectional view of the support rack taken along line 8—8 of FIG. 4.
FIG. 9 is a perspective view of article locator and retrieval mechanisms of the electronic librarian and filing system of the present invention.
Figures 10A, 10B, 11:
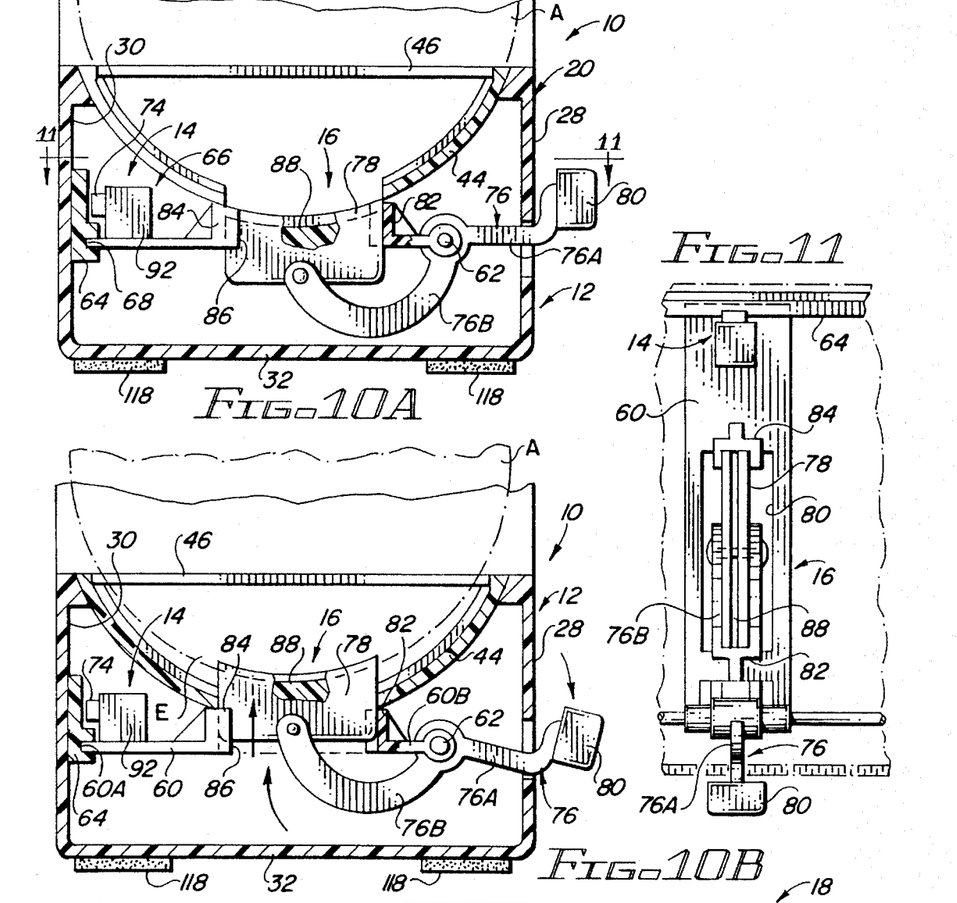
FIG. 10A is a side elevational view of the article locator and retrieval mechanisms showing the article retrieval mechanism in an unactuated rest position.
FIG. 10B is a side elevational view similar to that of FIG. 10A but showing the article retrieval mechanism in an actuated raised position.
FIG. 11 is a top plan view of the article locator and retrieval mechanisms as seen along line 11—11 of FIG. 10A.
Figure 12:
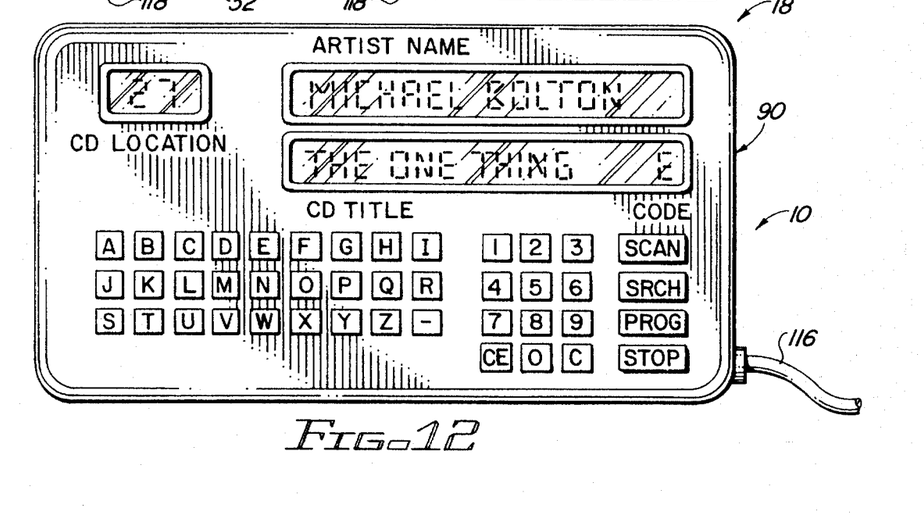
FIG. 12 is a front elevational view of a first embodiment of an electronic control unit of the electronic librarian and filing system of the present invention.
Figure 13:
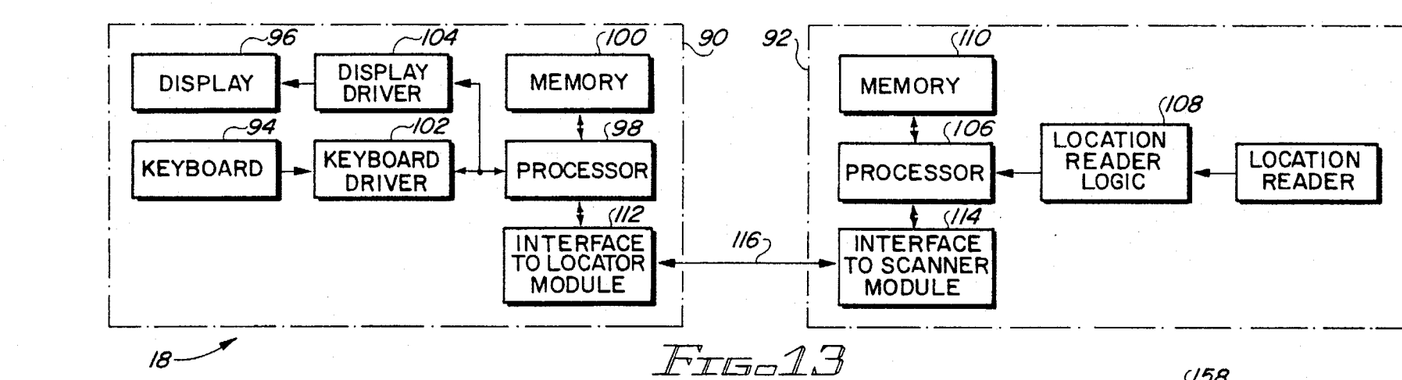
FIG. 13 is a first embodiment of an electrical block diagram of the electronic control unit of FIG. 12.

Referring to the drawings and particularly to FIGS. 1 and 12, there is illustrated a first embodiment of an electronic librarian and filing system of the present invention, generally designated 10. Basically, the first embodiment of the electronic librarian and filing system 10 includes an article storage unit 12 (FIGS. 1–8), article locator mechanism 14 (FIGS. 9–11) and article retrieval mechanism 16 (FIGS. 9–11). Also, preferably, the system 10 includes an electronic control unit 18, a first embodiment of which is shown in FIGS. 12 and 13.

The article storage unit 12 stores disc-shaped articles A, such as individual CD's (which hereinafter will also be understood to include CD-ROMs) on edge, in successive side-by-side spaced unique locations. The article locator mechanism 14 is disposed in the article storage unit 12 and movable relative to the successive articles A to read the unique locations thereof in the article storage unit 12. The article retrieval mechanism 16 is moved with the article locator mechanism 14 and can be actuated to partially remove or raise a selected one of the articles A from its location in the article storage unit 12 so that it can subsequently be fully removed therefrom, such as manually by a user. The electronic control unit 18 is coupled to the article locator mechanism 14 to provide a display of the unique locations of the articles as they are read by the article locator mechanism 14. The electronic control unit 18 also functions to input, store and retrieve information identifying all of the articles A stored in the article storage unit 12 and their unique locations therein such that the unique location of a selected one of the articles can be found.

Referring to FIGS. 1–8, the article storage unit 12 of the system 10 includes an elongated receptacle 20, a support rack 22, and an elongated handle 24, and a cover assembly 26. The receptacle 20 of the article storage unit 12 has a pair of front and rear walls 28, 30, a bottom wall 32, and a pair of end walls 34, 36. The walls are connected together at their adjacent edges so as to define an interior cavity 38. The end walls 34, 36 have semi-cylindrical upper portions which extend above the horizontal upper edges of the front and rear walls 28, 30 so as to define a semi-cylindrical opening 40 on the upper portion of the receptacle 20 leading into the interior cavity 38 thereof.

The support rack 22 of the article storage unit 12 is disposed in the interior cavity 38 of the receptacle 20 below the upper opening 40 thereof and defines a plurality of individual storage compartments 42 for receiving and supporting a plurality of articles A, such as CD's positioned vertically on edge, in a spaced side-by-side relationship. The support rack 22 includes a bottom wall 44 having a curved configuration of semi-cylindrical shape and a top wall 46 overlying and fitted upon the upper end of the bottom wall 44 and having a flat configuration. The storage compartments 42 are defined by a series of spaced recesses 48 defined between ribs 50 formed on the interior surface of the bottom wall 44 and a series of spaced slots 52 defined through the top wall 46. The spaced slots 52 are disposed above and in alignment with the recesses 48 so as to receive articles through the respective slots 52 of the top wall 46 and support the lower edge portions E of the articles A in the recesses 48. The recesses 48 have the same curved or semi-cylindrical shape as the bottom wall 44 for accommodating the semi-circular edge portions E of the CD's. The ribs 50 also have bevelled outer edges 50A which assist in guiding insertion of the curved edges E of the CD's into the recesses 48.

The carrying handle 24 of the article storage unit 12 has a generally U-shaped configuration and is pivotally mounted at opposite end legs 24A, 24B thereof to the opposite end walls 34, 36 of the receptacle 20 to undergo pivotal movement relative to the receptacle 20 between an upright position, as shown in FIG. 1, and a folded position, as shown in FIGS. 2A–2C and 4. In the upright position of FIG. 1, the handle 24 is deployed above and along the upper opening 40 to the interior cavity 38 of the receptacle 20 permitting gripping of the handle 24 and carrying of the storage unit 12. In the folded position of FIGS. 2A–2C and 4, the handle 24 is stowed behind the receptacle 20 out of the way.

The cover assembly 26 of the article storage unit 12 includes arcuate-shaped front and rear lid sections 54, 56 being slidable mounted at respective opposite ends in matching arcuate-shaped guide channels 58 formed on the interior surfaces of the opposite end walls 34, 36 of the receptacle 20. As seen specifically in FIGS. 2A–2C, the front and rear lid sections 54, 56 are movable relative to the receptacle 20 between a closed position (FIGS. 1 and 2A) and an opened position (FIG. 2C). In the closed position of FIG. 1, the front and rear lid sections 54, 56 are disposed in side-by-side relationship with respect to one another and together extend over the interior cavity 38 and cover the semi-cylindrical opening 40 defined in an upper portion of the receptacle 20 between the opposite end walls 34, 36 thereof. In the opened position of FIG. 2C, the front and rear lid sections 54, 56 are disposed in overlapped relationship with respect to one another and uncover and expose the semi-cylindrical opening 40 defined in the upper portion of the receptacle 20.

Referring to FIGS. 9–11, the article locator mechanism 14 of the system 10 includes a carriage 60, means in the form of spaced front and rear guide members 62, 64 mounting the carriage 60 to undergo movement in the receptacle 20 along the guide members 62, 64, and a location reading arrangement 66 mounted on the carriage 60 and receptacle 20. The carriage 60 of the article locator mechanism 14 is mounted between laterally spaced front and rear guide members 62, 64 to undergo sliding movement between opposite end walls 34, 36 of the receptacle 20. The front and rear guide members 62, 64 are located in the lower portion of the interior cavity 38 of the receptacle 20 below the support rack 22 therein. In an exemplary form, the front guide member 62 is in the form of a rod 62 mounted between the opposite end walls 34, 36 of the receptacle 20 and in spaced relation from the front wall 28 thereof. The rear guide member 64 is in the form of a rail 64 attached along the interior surface of the rear wall 30 of the receptacle 20. The carriage 60 is in the form of a flat platform 60 having a rear edge portion 60A slidably received within a groove 68 of the rear guide rail 64 and a pair of spaced collars 70 attached to an opposite front edge portion 60B of the platform 60 and slidably received over the front guide rod 62.

The location reading arrangement 66 of the article locator mechanism 14 includes a row of markings 72 and a location reader device 74. The markings 72 may take any suitable form, such as spaced parallel painted lines applied on or spaced parallel indents defined in the rear wall 30 of the receptacle 20 located above the rear guide rail 64. Each marking 72 is aligned with one of the storage compartments 42 in the support rack 22 and thus identifies a unique location of one of the articles A supported and stored by the support rack 22. The location reader device 74 is mounted on an upper surface of the carriage 60 adjacent to the rear edge portion 60A thereof and faces toward the row of markings 72. The reader device 74 is operable to sense individual ones of the different markings 72 when aligned therewith and thus provide a reading of the one of the markings 72 with which it happens to be aligned. The operation of the reader device 74 and markings 72 can be based on any of several conventional techniques, such as photoelectric, magnetic and the like. In the case of photoelectric techniques, the reader device 74 would emit and receive a light beam which is reflected back by individual ones of the markings 72.

Referring again to FIGS. 9–11, the article retrieval mechanism 16 of the system 10 includes an actuator lever 76 and an ejector member 78 which are supported by the carriage 60 of the article locator mechanism 14 and thus are adapted to work in coordination with the article locator mechanism 14. The actuator lever 76 of the article retrieval mechanism 16 16 is pivotally mounted on the front guide rod 62 and has a outer handle portion 76A and an inner link portion 76B. The outer handle portion 76A of the actuator lever 76 has a knob 80 thereon which extends to exterior of the receptacle 20 to where it can be gripped by a user in order to slidably move the carriage 60. The inner link portion 76B of the actuator lever 76 is pivotally coupled to the ejector member 78.

The ejector member 78 of the article retrieval mechanism 16 underlies the support rack 22 in the receptacle 20 and is slidably mounted between a pair of guide tracks 82, 84 being U-shaped in cross-section and facing toward one another. The guide tracks 82, 84 are attached to the carriage 60 and disposed at opposite ends of an opening 86 defined through the carriage 60. The ejector member 78 is thereby mounted to undergo vertical movement through the opening 86 and relative to guide tracks 82, 84. Once the reader device 74 and thus the carriage 60 have been moved into alignment with the one of the markings 72 identifying the location of the one of the storage compartments 42 in the support rack 22 containing the desired article A, such as the desired CD, to be retrieved, then the actuator lever 76 is pivoted to slidably move and lift the ejector member 78 upwardly through an elongated slot 44A formed in the bottom wall 44 of the support rack 22. A concave-shaped groove 88 in the upper end of the ejector member 78, being moved in an upwardly direction by the actuator lever 76, receives the lower edge E of the CD therein. The ejector member 78 pops up or lifts the CD partially upwardly from the one storage compartment 42 of the support rack 22 so as to make it easy for the user to then grip portions of the CD and remove it from the receptacle 20.

Referring to FIGS. 12 and 13, the electronic control unit 18 of the system 10 can include a portable scanner module 90 and a locator module 92. The portable scanner module 90 is a hand-held device which can be carried by the user to and from the location of use, such as a vehicle. At the location of use, the scanner module 90 can be inserted into a mounting bracket (not shown) or the like and then electrically connected to the locator module 92 in the storage unit 12.

The scanner module 90 of the control unit 18 includes a keyboard 94 to use to input information which identifies CD's stored in the article storage unit 12 and their unique locations, a display 96 to output such information, a microprocessor 98 to process inputted information and the information obtained from reading the locations of the CD's by the article locator mechanism 14, and a memory 100 to store the information being coupled to the microprocessor 98. The keyboard 94 and display 96 are coupled to the microprocessor 98 via respective keyboard and display drivers 102, 104. Information stored in the memory 100 can be accessed via the microprocessor 98 by use of the keyboard 94 and reviewed on the display 96.

The locator module 92 is mounted on the carriage 60 in the storage unit 12 and is electrically coupled to the reader device 74 of the article locator mechanism 14. The locator module 92 of the control unit 18 can include a locator microprocessor 106 connected through suitable location reader logic 108 to the location reader device 74 and a memory 110 coupled to the locator microprocessor 106. The microprocessors 98, 106 of the respective scanner and locator modules 90, 92 are coupled to one another through respective interfaces 112, 114 which, in turn, are connected to one another by a cable 116 shown in FIG. 12 and diagrammatically represented by line 116 in FIG. 13.

The scanner microprocessor 98 can be programmed to function in scan and search modes so as to access the memory 100 and find the unique location of a selected CD in the article storage unit 12. Once the desired location has been identified, the user can then move the location reader device 74 of the article locator mechanism 14 relative to the receptacle 20 and read the respective markings 72 thereon and find the desired unique location of the selected CD in the article storage unit 12 so that the article retrieval mechanism 16 can be operated to at least partially lift out or "pop-up" the selected CD.

In the initial filling of the storage unit 12 with CD's, as each CD is inserted into each unique location in the receptacle 10 the keyboard 94 is used to enter the location number, artist's name and CD title into the scanner microprocessor 98. Also, a code for the type of music (for example, "R" for Rock, "C" for Classical, "E" for Easy Listing, "O" for Oldies, "P" for Pop, etc.), is entered. As each are entered the information is displayed on the different windows of the display 96 on the front of the scanner module 90, as seen in FIG. 12. This information is automatically stored in the scanner memory 100.

In the scan mode, the scanner microprocessor 98 allows the user to review the entire CD library in the storage unit 12, starting with the first location and moving sequentially through to the last location. By pressing a SCAN button on the scanner module 90, the microprocessor 98 will scan memory 100 and the display 96 will display each location number, artist's name, CD title and type of music category in memory. Each will be displayed for a preset period of time, such as about three seconds for the use to read the display 96. The user may use the STOP button to stop the scanning at any time and then select a CD.

In the search mode, the scanner module 90 can function in two ways. It can search for the music type or the artist's name. In the music type search, the user can search for CD's of a particular type of music, for example, the Rock category. By pressing the SEARCH button and then entering the type of music code, which here would be "R", the microprocessor 98 will scan memory 100 and the display 96 will move sequentially through all of the CD's that are entered under that category. It will display the location number, the artist's name and the CD title, each for about three seconds. The user may stop the search at any selection and select the CD at that point. In the artist's name type search, the procedure is similar. By pressing the SEARCH button and then entering the artist's name, the display will sequentially show all the CD's that are stored in the storage unit 12 by that artist. The title of the CD, its location number and type of music code will be displayed. Each will be displayed for about three seconds. The user may stop the search at any selection and select the CD at that point to retrieve the particular CD. To retrieve the CD, the user uses the knob 80 to slide the carriage 60 and move the location reader device 74 along the row of markings 72. As the markings 72 are sensed, they are sequentially read and displayed on the display 96, enabling the user to locate each of the CD's stored in the storage unit 12 and thus the particular one desired to be retrieved.

As illustrated herein, the system 10 is provided in two separate physical units, the storage unit 12 and the scanner module 90 of the control unit 12. The flat bottom wall 32 has traction pads 118 applied on the corners thereof, as seen in FIG. 3, to facilitate use while resting on a vehicle seat or center console. The separate scanner module 90 and storage unit 12 could be provided as a single unit. The separate units also could be incorporated into other equipment, such as desks and filing cabinets, for application in an office environment.

Figure 14:
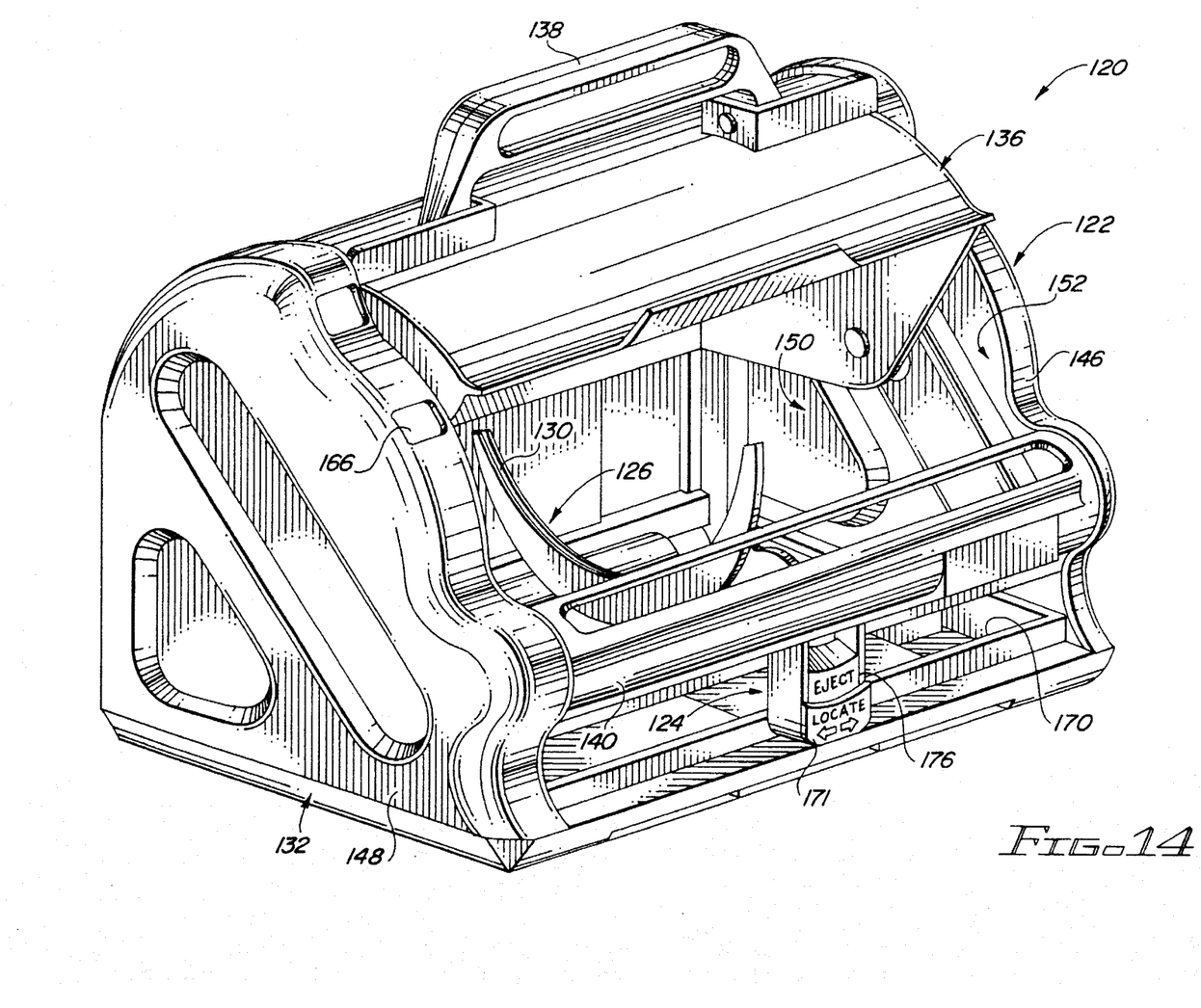
FIG. 14 is a perspective view of a second embodiment of an article storage unit of an electronic librarian and filing system of the present invention.
Figures 23, 24:
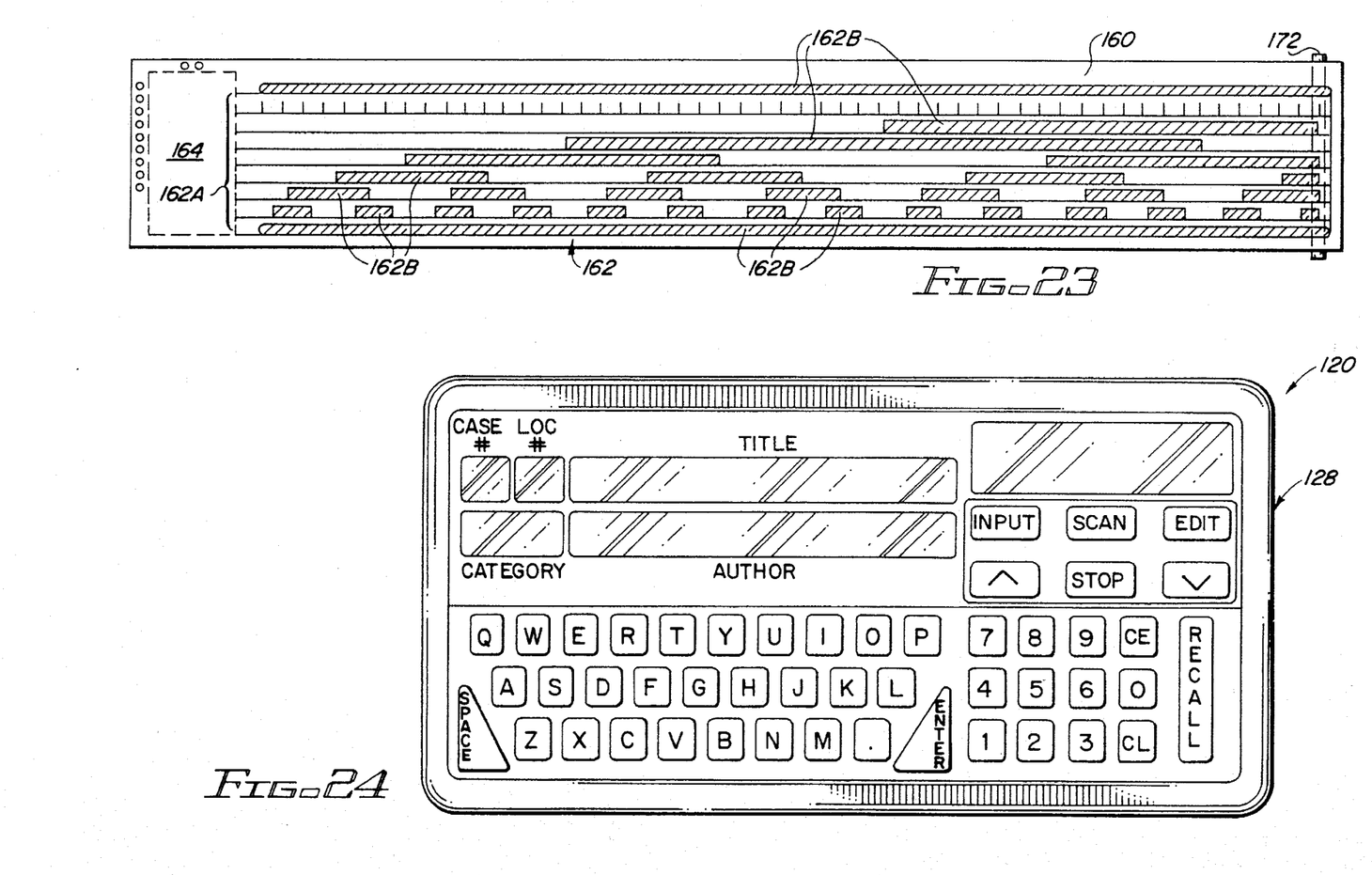
FIG. 23 is a plan view of a layout of multiple conductor tracks on a printed circuit board employed in the stationary portion of the article locator mechanism.
FIG. 24 is a front elevational view of a second embodiment of an electronic control unit of the electronic librarian and filing system.

Referring now to FIGS. 14 and 23, there is illustrated a second embodiment of an electronic librarian and filing system of the present invention, generally designated 120. Basically, the second embodiment of the electronic librarian and filing system 120 includes an article storage unit 122 (FIGS. 14 and 15), an article locator mechanism 124 (FIGS. 14–23) and article retrieval mechanism 126 (FIGS. 14–20). Also, preferably, the system 120 includes an electronic control unit 128, as shown in FIG. 24.

Figure 15:
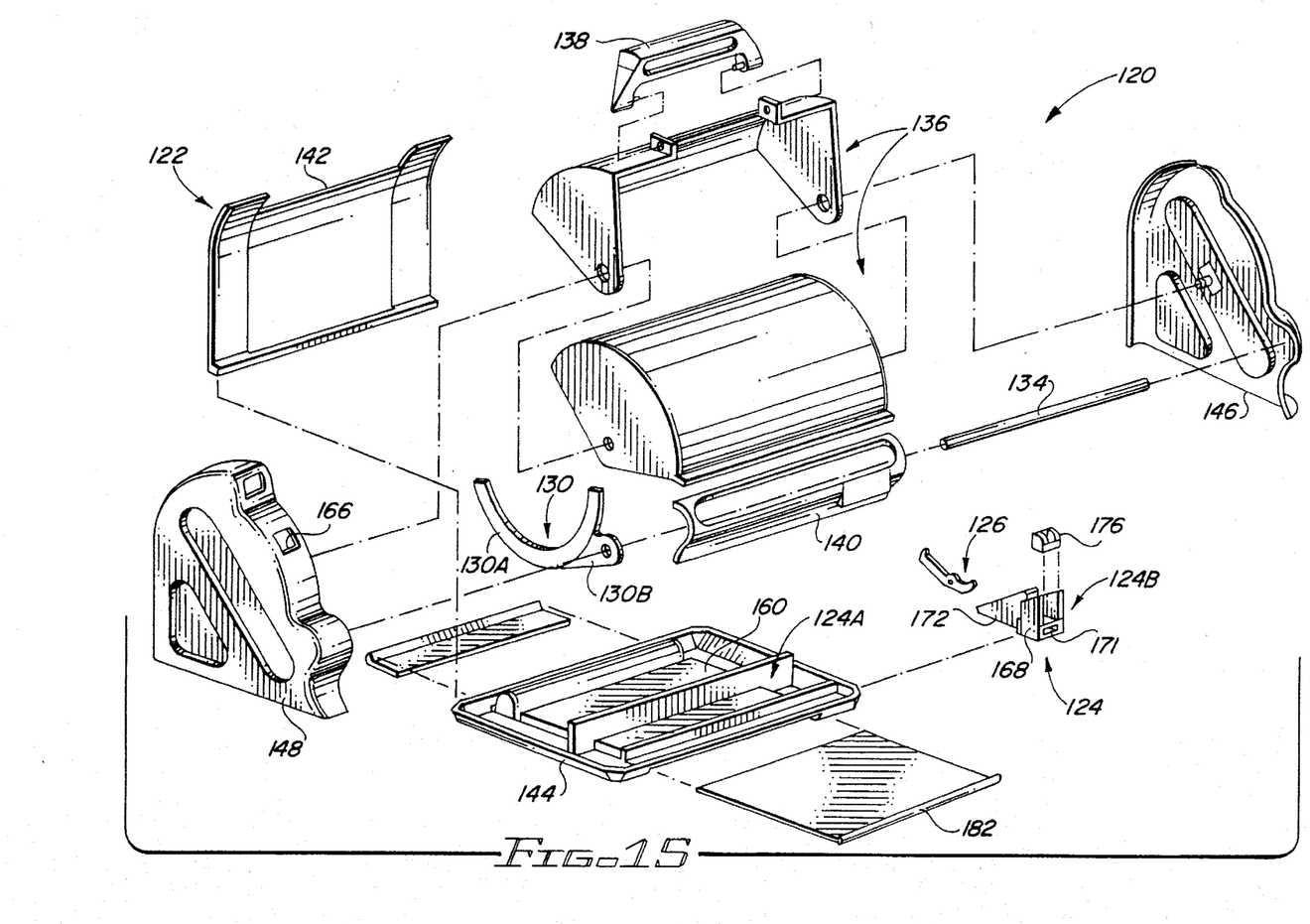
FIG. 15 is an exploded perspective view of the article storage unit of FIG. 14.

The article storage unit 122 stores a plurality of the disc-shaped articles A, such as individual CD's (which hereinafter will also be understood to include CD-ROMs). The article storage unit 122 has a plurality of storage and retrieval arms 130 (only one being shown) being equal in number to the number of unique locations in the unit 122 and to the number of disc-shaped articles stored in the unit 122 at such locations. The arms 130 are pivotally mounted in the unit 122 and positioned in side-by-side relationship to one another between opposite ends of the unit 122. Each arm 130 receives and holds one disc-shaped article A on edge in a vertical plane and thus defines one of the successive side-by-side spaced unique locations of the articles in the unit 122. The article locator mechanism 124 is disposed in the article storage unit 122 and has a first portion 124A stationarily positioned in the unit 122 and a second portion 124B movable relative to the first portion 124A to read the unique locations of the articles in the article storage unit 122. The article retrieval mechanism 126 is moved with the movable second portion 124B of the article locator mechanism 124 and can be actuated to partially remove or raise a selected one of the articles from its location in the article storage unit 122 so that it can subsequently be fully removed therefrom, such as manually by a user. In the second embodiment of the system 120, the electronic control unit 128 is not coupled to and thus is separate from the article locator mechanism 124. In this embodiment, the article locator mechanism 124 provides a readout on the article storage unit 122 of the unique locations of the articles as they are read by the article locator mechanism 124 upon movement of its second portion 124B relative to the first portion 124A thereof. The electronic control unit 128 functions to input, store and retrieve information identifying all of the articles stored in the article storage unit 122 and their unique locations therein such that the unique location of a selected one of the articles can be recovered by entering certain information to scan the memory of the unit 128.

Referring now to FIGS. 14 and 15, the article storage unit 122 of the system 120 includes an elongated receptacle 132, the aforementioned plurality of storage and retrieval arms 130, an elongated shaft 134 pivotally mounting the arms 130, a cover assembly 136 and a handle 138 connected to the cover assembly 136. The receptacle 132 of the article storage unit 122 has a pair of front and rear walls 140, 142, a bottom wall 144, and a pair of end walls 146, 148. The walls are connected together at their adjacent edges so as to define an interior cavity 150. The end walls 146, 148 have respective upper edges which extend above the horizontal upper edges of the front and rear walls 140, 142 with the rear wall 142 being of a greater height than the front wall 140 so as to define an opening 152 in the receptacle leading into the interior cavity 150 thereof which opening 152 extends between the end walls 146, 148 from the higher rear wall 142 across the top of the receptacle 132 and partially down the front thereto to the shorter front wall 140.

Unlike the first embodiment of the article storage unit 12 of FIGS. 4 to 8, the second embodiment of the article storage unit 122 of FIGS. 14 and 15 has no stationary support rack in the interior cavity 150 of the receptacle 132. Instead, the article storage unit 122 has the plurality of storage and retrieval arms 130 which are pivotally mounted on the elongated shaft 134 below the upper opening 152 of the receptacle 132 and, as mentioned above, define the plurality of unique individual locations at which the plurality of articles are received and supported on edge in the spaced side-by-side relationship. The elongated shaft 134 extends between and is mounted at its opposite ends to the opposite end walls 146, 148 of the receptacle 132 adjacent to and rearwardly of the front wall 140 thereof.

Figures 16, 17, 18:
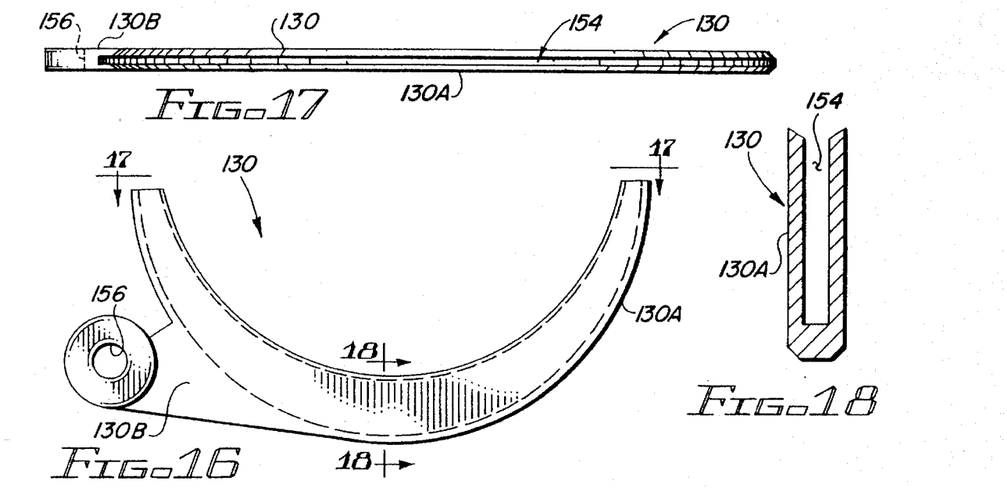
FIG. 16 is an enlarged side elevational view of a storage and retrieval arm removed from the unit.
FIG. 17 is a top plan view of the arm as seen along line 17—17 of FIG. 16.
FIG. 18 is an enlarged cross-sectional view of the arm taken along line 18—18 of FIG. 16.

Referring to FIGS. 16–18, each storage and retrieval arm 130, being aligned with one of the unique locations, has an arcuate-shaped supporting portion 130A defining an arcuate-shaped narrow groove 154 defined therein in which a respective article A can be received and held on edge in a vertical plane aligned with the respective one of unique locations. The groove 154 is sufficiently deep to adequately hold the article A in a vertical plane but sufficiently shallow so as to only contact the peripheral edge portion E thereof where no data, information or the like is stored or recorded on the disc-shaped article A. Each arm 130 also has a mounting portion 130B protruding trangentially from the article supporting portion 130A and defining a hole 156 for receiving therethrough the elongated shaft 134.

Figures 21, 22:
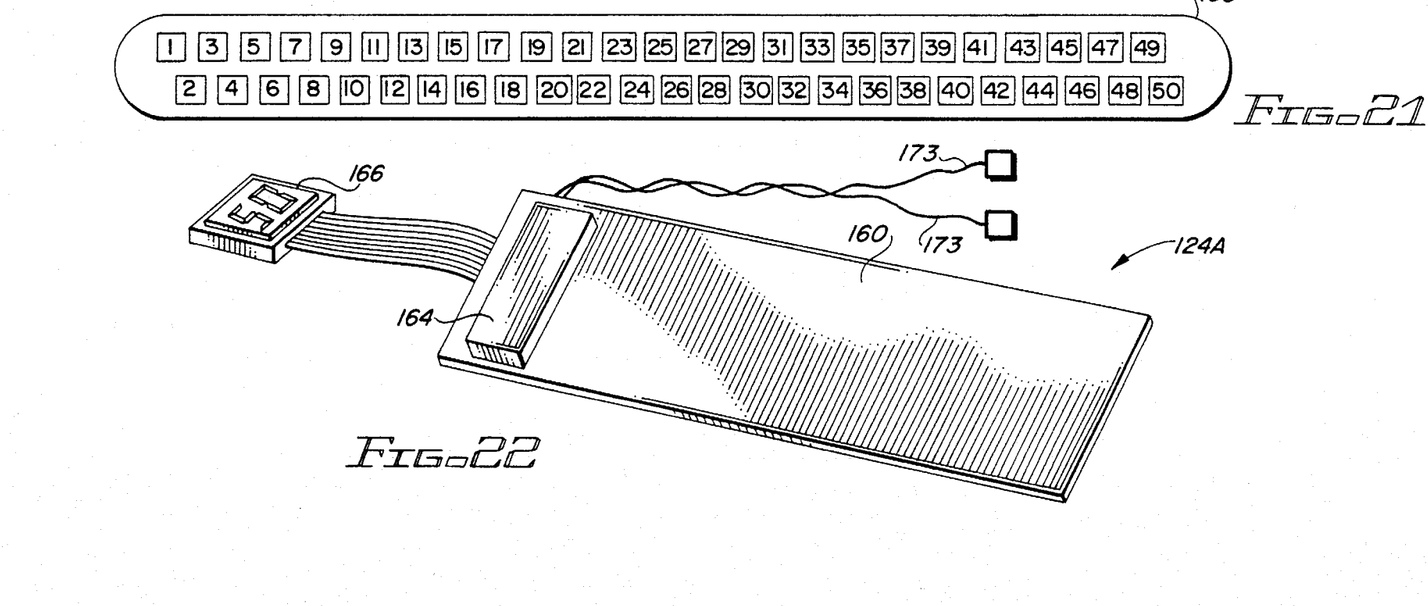
FIG. 21 is a front elevational view of a second embodiment of a stationary portion of the article locator mechanism in the form of a strip mounted along the front of the receptacle containing a row of indicia marking the succession of unique locations therein.
FIG. 22 is a perspective view of a third embodiment of a stationary portion of the article locator mechanism in the article storage unit.

Referring to FIGS. 21–23, in the second embodiment of the system 120, the stationary first portion 124A of the article locator mechanism 124 includes an elongated strip 158, of a suitable material such as plastic, mounted along the front wall 140 of the receptacle 132 containing a row of indicia, such as numbers 1 to 50, for marking the succession of unique locations defined in the receptacle 132. The stationary first portion 124A of the article locator mechanism 124 also, although not necessarily, includes a printed circuit board 160 containing multiple parallel conductors tracks 162 thereon and mounted in the interior cavity 150 of the receptacle 132 on an interior surface of the bottom wall 144 thereof. The stationary first portion 124A of the article locator mechanism 124 further includes an integrated driver circuit 164 is connected to the same one ends 162A of the respective conductor tracks 162 and an LED display 166 is connected to the integrated driver circuit 164. The movable second portion 124B of the article locator mechanism 124 is in the form of a slide carriage 168 mounted through a horizontal slot 170 defined in the front wall 140 of the receptacle 132 to undergo sliding movement therealong, a locate knob 171 mounted to the outer side of the carriage 168, and an elongated conductor member 172 attached at one end 172A to the inner side of the carriage 168 so as to extend into the interior cavity 150 of the receptacle 132 transversely to and overlying the printed circuit board 160 and engage certain ones of the parallel conductor tracks 162. As the conductor member 172 is moved along the tracks 162 with movement of the carriage 168 along the slot 170 in the receptacle 132 by the user gripping and moving the knob 171, the conductor member 172 is brought into contact with and complete electrical circuits with different combinations of the multiple tracks 162 having different lengths of exposed conductive portions 162B so as to conduct electricity through selected ones of the tracks 162 which form a number, such as a binary-coded decimal (BCD) number, that corresponds to the particular location of the conductor member 172. The completed electrical circuits cause the integrated driver circuit 164 to drive the LED display 166 to form and display or indicate the particular number which corresponds to that of the location being passed by the conductor member 172. In such manner, the article locator mechanism 124 of the system 120 is operable to read and display the number of each of the unique locations of the articles stored in the receptacle 132. The LED display 166 and driver circuit 164 are connected by leads 173 to d.c. batteries (not shown) stored in the receptacle 132 and the circuit 164 is adapted to assume a sleep mode turning the LED display 166 off when not in use to conserve the batteries. When movement of the conductor member 172 is resumed, the LED display 166 is turned back on.

Figures 19, 20:
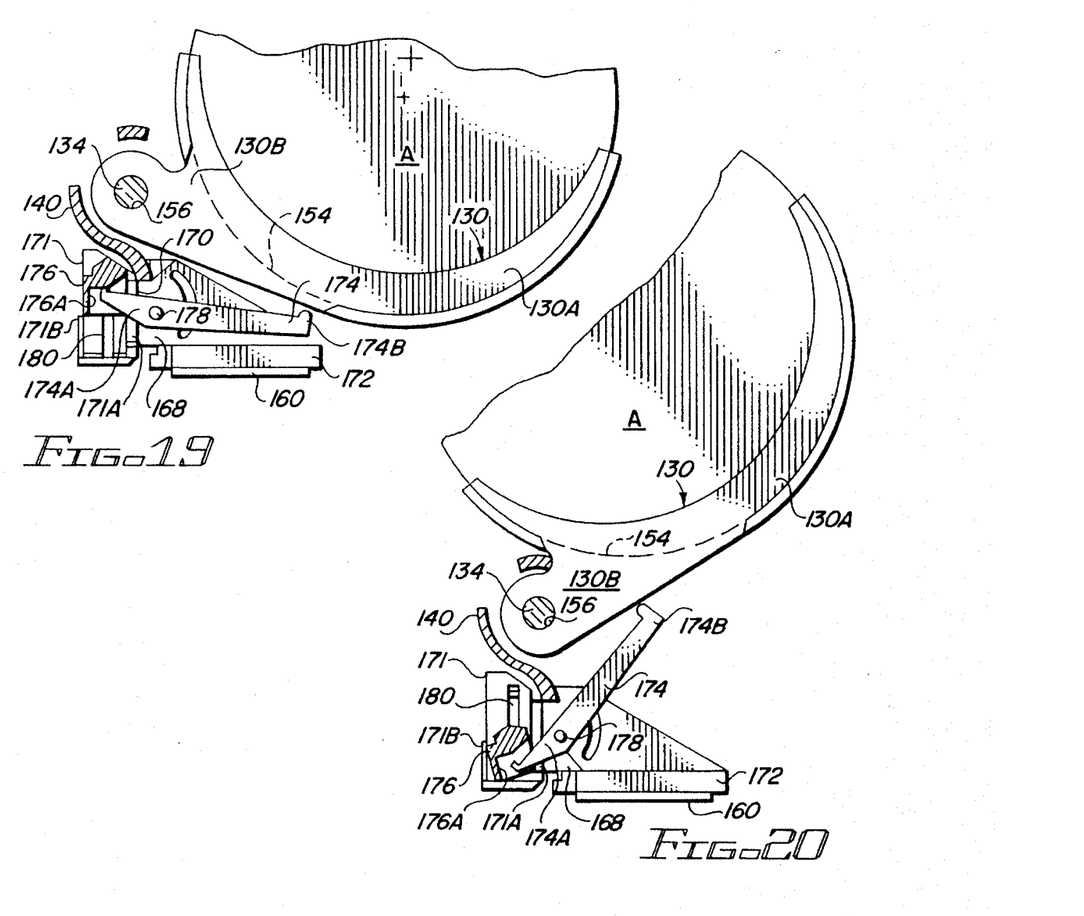
FIG. 19 is a side elevational view of the storage and retrieval arm and the article ejector mechanism showing the arm and article ejector mechanism in a storage position in which a disc-shaped article is held and supported on the arm.
FIG. 20 is a view similar to that of FIG. 19 but showing the arm and the article ejector mechanism in a loading and/or retrieving position in which the disc-shaped article is being filed into or removed from the unit.

Referring to FIGS. 19 and 20, in the second embodiment of the system 120, the article retrieval mechanism 126 is moved with the slide carriage 168 of the movable second portion 124B of the article locator mechanism 124 and can be actuated to partially remove or raise a selected one of the articles A from its unique location in the receptacle 132 of the unit 122 so that subsequently it can be fully removed therefrom, such as manually by a user. The article retrieval mechanism 126 includes an actuator lever 174 and an ejector member 176 which are supported by the slide carriage 168 of the article locator mechanism 124 and thus are adapted to work in coordination with the article locator mechanism 124. The actuator lever 174 at one end 174A is pivotally mounted on the carriage 168 about pivot 178 and extends forwardly through a rear opening 171A in the locate knob 171 and into a recess 176A formed in the ejector member 176. The actuator lever 174 also extends rearwardly from the pivot 178 to an opposite free end 174B being positioned below the pivotal storage and retrieval arms 130 (only one being shown). The ejector member 176 is vertically slidably mounted in a pair of opposite vertical slots 180 formed in the locate knob 171.

By the user gripping the locate knob 171, the locate knob 171 and the slide carriage 168 therewith can be moved and aligned with the desired unique location of the desired article A to be retrieved and thereby the actuator lever 174 is positioned below the particular arm 130 holding the article A. Then, by depressing the ejector member 176 the actuating lever 174 is pivoted upwardly from a lowered position to a raised position such that its free end 174B engages the bottom of the arm 130 and applies a force from below the arm 130 so as to cause the arm 130 to pivot upwardly and outwardly from a lowered position as seen in FIG. 19 to a raised position as seen in FIG. 20 toward the opening 152 in the receptacle 132 so as to project the desired article A at least partially upwardly and forwardly from interior cavity 150 of the receptacle 132 through the opening 152 and thus make it easy for the user to then properly grip portions of the article and fully remove it from the receptacle 132. There is a lip 171B formed on the front of the locate knob 171 which temporarily catches an edge of the ejector member 176 to hold it depressed and the actuator lever 174 and arm 130 in the raised positions, as shown in FIG. 20. By pivoting the ejector member 176 rearwardly, it is released and the actuator lever 174 and arm 130 are allowed to return to their lowered positions as seen in FIG. 19 due to the force of gravity and a spring biasing force applied downwardly to the actuator lever 174.

The electronic control unit 128, in the second embodiment of the system 120, is independent of the article locator mechanism 124 but substantially the same internally as the electronic control unit 18 of the first embodiment of the system 10. Thus, in the second embodiment, the electronic control unit 128 is not coupled to and thus is separate from the article locator mechanism 124. Also, in the second embodiment, the article locator mechanism 124 provides the LED display 166 on the exterior of the receptacle 132 of the article storage unit 122 which indicates the unique locations of the articles as they are read by the article locator mechanism 124 upon movement of its second portion 124B relative to the first portion 124A thereof, as described above. The electronic control unit 128 functions to input, store and retrieve information identifying all of the articles stored in the article storage unit 122 and their unique locations therein such that the unique location of a selected one of the articles can be recovered by entering certain information to scan the memory of the unit 128. While the electronic control unit 128 of FIG. 24 operates substantially the same as the electronic control unit 18 of FIG. 12, some of the functions are slightly modified as will be explained below.

Referring to FIG. 24, the electronic control unit 128 is used in conjunction with the article storage unit 122 to file and organize information about the unique locations of all of the articles in the receptacle 132. Such data as each CD's title, author, category and physical location in the receptacle can be entered into the memory in the unit 128. After this data has been entered, the entire memory may be scanned according to different categories so that any CD can be easily located. The scans available are a sequential scan, which outputs all entries in a particular receptacle, author scans, category scans and title scans. All entries may be edited, so that in case the locations of the CD's in the system change, or they are removed all together, then their new positions can be updated or their entries can be cleared altogether.

Basically, the electronic control unit 128 has three modes of operation: Input, Scan and Edit. Any of these three modes can be entered at any time by pressing the associated button or key with the mode name on it. By using these keys, the mode can be changed even during the operation of a different mode, aborting the current mode. For instance, if an Input operation is being performed, and the Scan key is pressed, the Input operation will be aborted and will have no effect on the contents of the unit 128 and the Scan operation will immediately start. The Input mode is used to enter CD data into the unit 128. After pressing the Input key, the user will be prompted to enter a new entry into the unit. Once the Scan key is pressed, the unit goes into a Scan mode. The user will be prompted for different information, depending on what type of Scan operation is being performed. The Edit mode allows the user to either move an entry to a different location, or to erase an entry from the unit's memory. After the Edit key is pressed, the user will be prompted to enter information to perform the edit operation. Finally, a Recall key is provided to allow the user to recall the last five CD's scanned. This feature provides the user with instant location numbers to insert each CD in its correct storage location in the receptacle.

From the above descriptions of the first and second embodiments of the electronic librarian and filing system 10, 120 of the present invention, it can be readily understood that both embodiments operate in accordance with a broad method of operation whose steps basically include the following: storing the plurality of disk-shaped articles A on edge in a plurality of successive side-by-side spaced unique locations between opposite ends of and in an interior cavity 38, 132 of the receptacle 20, 132; moving the article locator mechanism 14, 124 between the opposite ends of the receptacle 20, 132 past and successively into alignment with the respective locations therein so as to indicate the respective locations as the article locator mechanism 14, 124 is successively brought into alignment therewith; moving an article retrieval mechanism 16, 126 with the article locator mechanism 14, 124 successively into alignment with the respective locations until the article locator and retrieval mechanisms are positioned in alignment with a selected one of the unique locations storing a selected one of the articles; and actuating the article retrieval mechanism 16, 126 so as to at least partially remove the selected one of the articles from the unique location in the receptacle 20, 132 so that it can be fully removed from the receptacle 20, 132 of the article storage unit 12, 122. In the first embodiment of the system 10 of FIGS. 1–13, the article A is lifted along a liner path in a substantially upward direction relative to the receptacle 20. In the second embodiment of the system 120 of FIGS. 14–24, the article A is lifted along an arcuate path in a substantially upward and forward direction relative to the receptacle 132. In both embodiments, the article A is at least partially ejected from the interior cavity 38, 150 and through the opening 40, 152 in the receptacle 20, 132.

It should be realized that the article storage unit 12, 122 can be used alone. A slideout tray 182 is provided under the bottom wall 144 of the receptacle which allows a user to manually write the CD location information on an erasable sheet applied on the tray.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

I claim:

1. A system for filing, storing and retrieving thin disc-shaped articles, said system comprising:
   (a) an article storage unit having an elongated receptacle defining an interior cavity and an opening leading into said interior cavity, said article storage unit also having means for storing thin disc-shaped articles in a plurality of successive side-by-side spaced unique locations in said interior cavity of said elongated receptacle;
   (b) an article locator mechanism disposed in said article storage unit and having a first portion stationarily aligned with said unique locations and a second portion movable relative to said first portion and said unique locations aligned therewith to a selected one of said locations and adapted to indicate said selected unique location; and
   (c) an article retrieval mechanism disposed in said article storage unit and being movable with said second portion of said article locator mechanism, said article retrieval mechanism being actuatable to at least partially remove a selected one of the articles from said selected unique location in said article storage unit so that the selected article can subsequently be fully removed from said article storage unit;
   (d) said means for storing the articles including
      (i) support means disposed in said interior cavity of said receptacle extending along and adjacent to said opening and between and mounted at opposite ends of said receptacle, and
      (ii) a plurality of storage and retrieval arms disposed in said interior cavity and being equal in number to the number of articles stored in said interior cavity of said receptacle, said arms being mounted to said support means and positioned in side-by-side relationship to one another and in alignment with said unique locations so as to undergo pivotal movement, in response to actuation of said retrieval mechanism, along an arcuate path from a lowered position in which the articles are disposed within said interior cavity adjacent to said opening to a raised position in which the articles partially extend from said interior cavity through said opening.

2. The system of claim 1 wherein said first portion of said article locator mechanism includes an elongated strip mounted on said receptacle and extending between opposite ends of said receptacle, said elongated strip containing a row of indicia marking said plurality of unique locations of the articles.

3. The system of claim 1 wherein said receptacle has front, rear, bottom and opposite end walls interconnected together and defining said interior cavity and said opening.

4. The system of claim 1 wherein said first portion of said article locator mechanism includes a row of location markings on said receptacle in alignment with said plurality of unique locations.

5. The system of claim 1 wherein said article retrieval mechanism includes an ejector member supported by said movable second portion of said article locator mechanism for undergoing movement relative to said storage and retrieval arms aligned with said unique locations.

6. The system of claim 5 wherein said article retrieval mechanism also includes an actuator lever pivotally mounted on said movable second portion of said article locator mechanism and extending therefrom to below said storage and retrieval arms and being adapted by depressing said ejector member to cause pivoting of said actuating lever upwardly so as to apply a force to said arm causing said arm to pivot upwardly and outwardly toward said opening in said receptacle to move the article upwardly and forwardly and at least partially from said interior cavity of said receptacle and through said opening therein.

7. The system of claim 1 wherein each of said arms has an arcuate shaped groove defined therein in which one of the articles is received and held on edge in parallel relation to the other articles and is aligned with one of the successive side-by-side spaced unique locations.

8. The system of clam 1 further comprising:
   a cover assembly mounted to said receptacle to undergo movement between closed and opened positions relative to said opening in said receptacle.

9. The system of claim 8 further comprising:
   a handle being mounted to one of the cover assembly and the receptacle to undergo movement between a generally upright position in which said handle is deployed above said receptacle permitting gripping of the handle and carrying of said article storage unit and a stowed position in which said handle is located along a rear side of said receptacle away from said opening therein.

10. The system of claim 8 wherein said cover assembly includes front and rear lid sections movable relative to the receptacle between said closed and opened positions, said front and rear lid sections in said closed position being disposed in a generally tandem side-by-side relationship with respect to one another extending over and covering said opening in said receptacle and in said opened position, said front and rear lid sections in said opened position being disposed in overlapped relationship with respect to one another and exposing said opening in said receptacle.

11. The system of claim 1 wherein said support means includes is an elongated shaft, said storage and retrieval arms being mounted to said shaft in said side-by-side relationship to one another and in alignment with said unique locations so as to undergo pivotal movement along said arcuate path between said lowered and raised positions.

12. A system for filing, storing and retrieving thin disc-shaped articles, said system comprising:

(a) an article storage unit having an elongated receptacle defining an interior cavity and an opening leading into said interior cavity, said article storage unit also having means for storing thin disc-shaped articles in a plurality of successive side-by-side spaced unique locations in said interior cavity of said elongated receptacle;

(b) an article locator mechanism disposed in said article storage unit and having a first portion stationarily aligned with said unique locations and a second portion movable relative to said first portion and said unique locations aligned therewith to a selected one of said locations and adapted to indicate said selected unique location, said first portion of said article locator mechanism including multiple parallel conductors tracks being mounted in said interior chamber of said receptacle and having different lengths of exposed conductive portions; and (c) an article retrieval mechanism disposed in said article storage unit and being movable with said second portion of said article locator mechanism, said article retrieval mechanism being actuatable to at least partially remove a selected one of the articles from said selected unique location in said article storage unit so that the selected article can subsequently be fully removed from said article storage unit.

13. The system of claim 12 wherein said first portion of said article locator mechanism also includes:

a driver circuit connected to said respective conductor tracks; and a display connected to said driver circuit.

14. The system of claim 13 wherein said second portion of said article locator mechanism is an elongated conductor member mounted to said receptacle to undergo movement between said opposite ends thereof and to extend into said interior cavity of said receptacle transversely to and overlying and engaging certain ones of said parallel conductor tracks such that, as said conductor member is moved along said tracks, said conductor member completes an electrical circuit with different combinations of said multiple tracks having said different lengths of exposed conductive portions so as to conduct electricity through selected ones of the tracks to said driver circuit and thereby cause said display to indicate a number corresponding to the particular unique location of said conductor member is aligned.

\* \* \* \* \*